United States Patent [19]
Marsh et al.

[11] Patent Number: 5,353,009
[45] Date of Patent: Oct. 4, 1994

[54] COMMUNICATION SYSTEM

[75] Inventors: Michael J. C. Marsh, Johannesburg; Raymond C. Atkins, Pretoria; Trevor M. Hodson, Randburg, all of South Africa

[73] Assignee: CSIR, Transvaal, South Africa

[21] Appl. No.: 87,123

[22] Filed: Jul. 7, 1993

Related U.S. Application Data

[63] Continuation of Ser. No. 816,897, Jan. 3, 1992, abandoned.

[30] Foreign Application Priority Data

Jan. 4, 1991 [ZA] South Africa .................. 91/0077

[51] Int. Cl.⁵ .................................. G08B 26/00
[52] U.S. Cl. ............................ 340/505; 340/517; 340/518; 340/825.06
[58] Field of Search ............ 340/505, 517, 518, 825.06

[56] References Cited

U.S. PATENT DOCUMENTS

| | | | |
|---|---|---|---|
| 4,394,655 | 7/1983 | Wynne et al. | 340/505 |
| 4,463,352 | 7/1984 | Forbes et al. | 340/505 |
| 4,468,655 | 8/1984 | Iwata | 340/505 |
| 4,573,041 | 2/1986 | Kitagawa et al. | 340/505 |
| 4,744,218 | 5/1988 | Edwards et al. | 340/825.06 |
| 4,816,808 | 3/1989 | Morita | 340/505 |
| 4,864,519 | 9/1989 | Appleby et al. | 340/825.06 |
| 4,896,277 | 1/1990 | Vercellotti et al. | 340/825.06 |

FOREIGN PATENT DOCUMENTS

| | | |
|---|---|---|
| 0216431 | 4/1987 | European Pat. Off. |
| 0346624 | 12/1989 | European Pat. Off. |
| 3736081 | 5/1989 | Fed. Rep. of Germany |

Primary Examiner—John K. Peng
Assistant Examiner—Edward Lefkowitz
Attorney, Agent, or Firm—Lowe, Price, LeBlanc & Becker

[57] ABSTRACT

A communication system comprises a control station and a number of remote stations connected to the control station by a multi-conductor harness. The control station houses a computer and supplies the remote stations with electrical power, as well as communicating bidirectionally with the remote stations, via the harness. At each remote station, a sensor or other functional module is plugged into an interface. Communication circuitry receives data from and sends data to the control station. The remote station includes an identification device for storing a first code allocated to the remote station by the central computer which identifies the relative location of the remote station, as well as a second code generated at the remote station which identifies the function of the sensor or other functional module.

14 Claims, 8 Drawing Sheets

TYPICAL DATA PACKET

HEADING  ADDR1  ADDR2  ADDR3  LENGTH ← DATA →
                                OF
                               DATA

COMMUNICATION SYSTEM

This is a continuation of application Ser. No. 07/816,897 filed Jan. 3, 1992, now abandoned.

BACKGROUND OF THE INVENTION

This invention relates to a communication system comprising a control station and a plurality of remote stations connected to the control station by a harness.

In mines and other working environments the need exists for information from a variety of different types of sensors and monitoring devices to be transmitted to a central control station where the data can be processed and acted upon. For example, in a mine, large numbers of gas and/or fire sensors may be connected to a control station, which analyses the data transmitted from each sensor and raises an alarm if necessary. Other sensors and monitoring devices may be provided to monitor water level, temperature, to identify vehicles and personnel and to transmit operating information directly from sophisticated machinery such as coal cutters. Two way communication between the control station and remote sensors, monitoring devices and machinery may be required.

In a large mine, there may be more than ten thousand personnel underground at one time. It is a mammoth task to co-ordinate the various technical operations taking place in such a mine from the central control station. Typically, voice communication channels are used by the underground personnel to request authorisation for the moving or replacement of sensors and other equipment. This requires operators at the control station to make a decision and to inform the underground personnel accordingly, and then to update a record at the control station.

Usually, a map is available at the control station on which the location of each sensor or monitoring device and its function are indicated. However, it will be appreciated that in an extensive mine or similar working environment, the creation and ongoing updating of such a map is a very time consuming process.

SUMMARY OF THE INVENTION

According to the invention a communication system comprises a control station and a plurality of remote stations connected to the control station by a multi-conductor harness, the control station supplying the remote stations with electrical power and communicating bidirectionally with the remote stations via the harness; each remote station including communication circuitry for receiving data from and sending data to the control station, and further including identification means for storing a first code allocated to the remote station by the control station, and a second code generated at the remote station.

The remote stations may be, for example, gas or fire sensors, or other monitoring devices.

Preferably the first code is an address code indicating the location of each remote station, the second code being an identity code indicating the function of the remote station.

The identification means may include data storage means for storing the first and second codes, and processor means for recording the first code in the data storage means and for retrieving the first and second codes from the data storage means, the communication circuitry being adapted to send and receive the codes and other data to and from the control station.

Preferably each remote station has interface means for connection of a functional module to the remote station, the interface means being adapted to supply electrical power to the module, to transfer data from the module to the communication circuitry, and to generate the second code according to the function of the module.

DESCRIPTION OF AN EMBODIMENT

Figure 1:
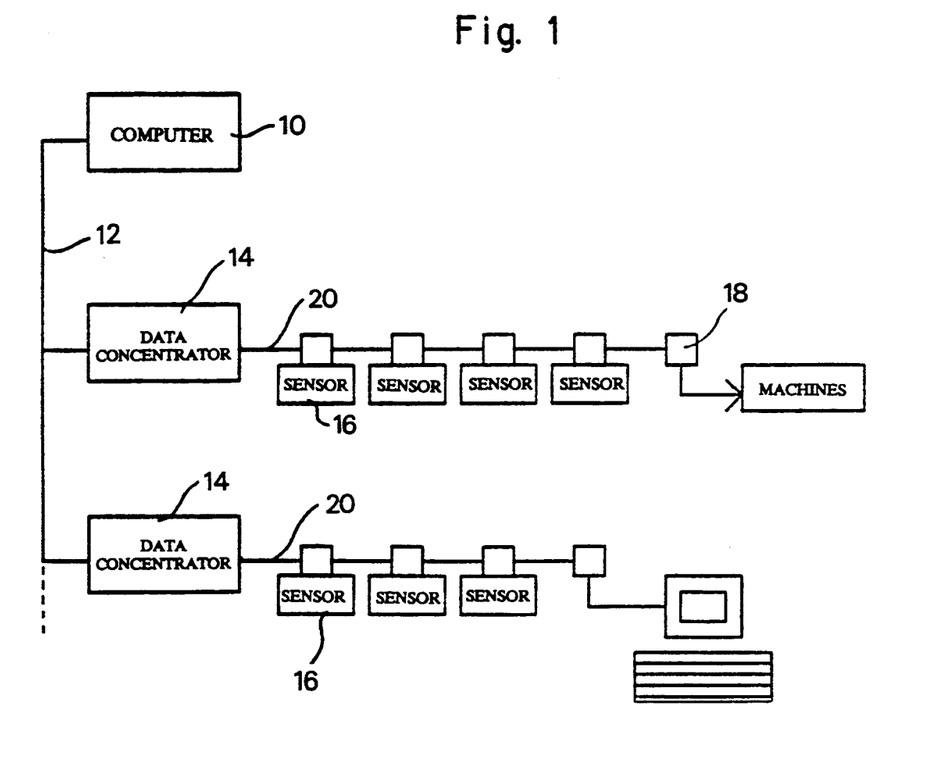
FIG. 1 is a schematic diagram of a communication system according to the invention.

The communication system illustrated in FIG. 1 is typically employed in a mine and includes a central control station 10 which includes a computer and which is connected by a dedicated communications bus 12 to data concentrators 14 at different levels of the mine. The data concentrators 14 allow high speed communication with the control station 10 via the bus 12, and also receive and transmit data from a variety of different sensors at remote stations 16 and monitoring devices 18 at each level. Each concentrator 14 handles the data traffic for its respective level and condenses that traffic into a form which can be communicated to the control station 10 via the bus 12.

From each concentrator 14 a cable or harness 20 runs into the mine working to the sensors at remote stations 16 and monitoring devices 18. The harness may be of a conventional nature, but is preferably a modular multi-conductor harness system. The preferred harness has three continuous conductors 22, 24 and 26 which provide power and ground connections to the sensors and monitoring devices, and a signal line 28 which allows communication between the sensors and monitoring devices and the respective data concentrators 14. (See FIG. 2).

Figure 2:
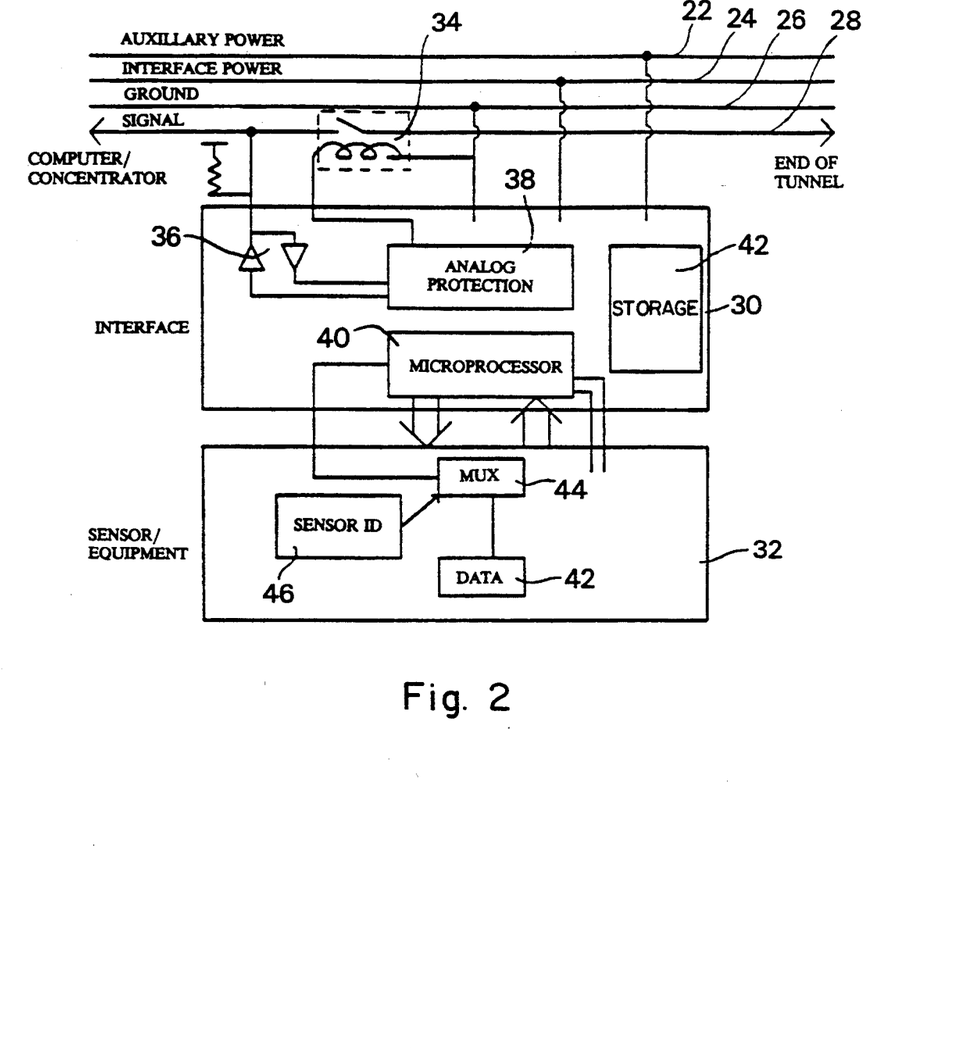
FIG. 2 is a more detailed schematic diagram of an individual remote station of the communication system of FIG. 1.

In FIG. 2, a remote station 16 is illustrated schematically in more detail. The remote station include a communications interface circuit 30 and an actual sensor or monitoring device 32 which is connected to the communications interface. The interface/sensor unit is plugged into a socket on the harness, so that it is connected directly to the ground and power lines of the harness. A relay 34 in the socket is arranged to be controlled by the communications interface, and can be opened when desired to isolate remote stations downstream from the communications interface from the signal line. An input circuit 36 is connected to the signal line 28 ahead of the relay contacts 34, so that the signal line 28 is continually monitored by the interface and also controlled by it. The communications interface includes analogue protection circuitry 38, a microprocessor 40 and a data storage element or memory 42 such as a RAM. The communications interfaces used by the various sensors and monitoring devices are identical. The analogue protection circuitry 38 protects the interface and the associated sensor or monitoring device from transients, overvoltages and other fault conditions, and provides power to the other electronic circuitry of the communications interface and the sensor itself. The microprocessor 40 monitors the signal line 28 and communicates therewith, and also controls the relay 34 via the protection circuit 38. The memory 42 buffers the messages on the signal line and stores address information which uniquely identifies the interface associated with a particular remote station.

The communications interface continually monitors the signal line 28 of the harness and recognises when it is being addressed with its own unique address. It is then able to read the packet message on the signal line and to transfer the received information into memory. The received information is then communicated to the sensor or monitoring device in an appropriate form. In the reverse direction, the sensor 32 transfers data to the communications interface which is stored in the memory 42 and which is then transmitted on the signal line 28 in block form.

While transmitting, the communications interface monitors the signal line by reading back the voltage on the signal line at the same time as transmission is taking place, to ensure that a second interface is not "talking" at the same time and thereby corrupting the message. If a clash of messages occurs, for example, if two interfaces transmit simultaneously or if the data concentrator 14 transmits at the same time, the interface will wait for a pseudo-random period related to its address code (or, alternatively, to the sensor identification code) and then attempt to retransmit the message. This will be repeated until the message gets through uninterrupted. All messages are terminated in a circular redundancy code, making it possible to verify that messages have been correctly received.

The sensor or monitoring device 32 typically includes a processor device 42 which generates data which is transmitted to the microprocessor 40 of the communications interface via a multiplexer 44. The sensor or monitoring device is also programmed with an identification code, typically set by hardwired jumpers or stored in a ROM 46, which can be communicated via the multiplexer 44 to the microprocessor 40.

The system is controlled by the computer 10 at the central control station on the surface. The computer issues commands, and stores and interprets the data for each sensor. All of the sensors effectively communicate directly with the computer 10 via the harness and the data concentrators, and the computer can then communicate with the respective sensors in response, or issue instructions to associated equipment.

Each remote station has a unique address (the first code) assigned to it by the computer on start-up of the system or when reidentification of remote stations takes place. The computer is able to direct data directly to any particular remote station by using the address of that remote station in the transmitted data packet. When data is transmitted from the remote station to the central computer, the remote station attaches its address to the data to indicate the source of the data. The computer is also able to issue general commands which are recognised by all remote stations. For example, the central computer may issue instruction such as: "Reset Remote Stations" or "Start Reidentification" or "End Reidentification".

When the system is initially powered up, and on the receipt of a reidentification code transmitted via the concentrators 14 from the central computer 10 to all of the remote stations on the respective harness 20, the system goes through a process of identifying each remote station. Initially, the communications interface of each remote station will open the relay 44 associated with each interface, thereby disconnecting the signal line of all the interfaces from the data concentrators and the central control station, with the exception of the very first interface on each harness. The concentrator will then transmit a code number "1" which will be received only by the first interface directly connected to the concentrator. This code will be stored in the memory 42 of the interface, effectively identifying the position of that remote station and giving it a unique identity code. The communications interface then closes the contacts of its associated relay 44, allowing the next remote station on the harness to be connected through to the concentrator 14. The concentrator now transmits a code number "2" which is ignored by the first interface, and loaded into the memory of the second interface. This process is repeated until all the interfaces of the remote stations have been addressed. After each interface has been addressed it replies on the signal line back to the concentrator, transmitting its identification code to the concentrator, and thus verifying that it has received and stored its address.

An enhancement can be added to the system, in terms of which each interface is adapted to add a further byte of information to its reply which identifies the type of sensor or other device associated with each interface. For example, a fire sensor could be indicated by the character "1", a methane sensor could be indicated by the character "2", a video display unit could be indicated by the character "3" and so on. In addition, the extra byte contains the identification code which was allocated to the remote station in question previously. Thus, even if a sensor between the data concentrator and a particular remote station is removed between two identification procedures, the system can keep track of both the position and type of the remaining sensors in the system. When sensors are removed and replaced, the data generated by a particular sensor is not lost when the system is reconfigured, but is retained by the central computer.

The computer 10 can use this information to generate an accurate map of the current layout of the sensors, and can load an appropriate software module for processing the data from the type of sensor in question from a selection of such modules. The second code identifying the sensor in question determines the choice of software module.

During operation of the system, it will thus be seen that the concentrator can identify each remote station both in terms of the address allocated to the remote station, as well as by the sensor code of that remote station, allowing a map to be generated of the entire system.

Figure 7:
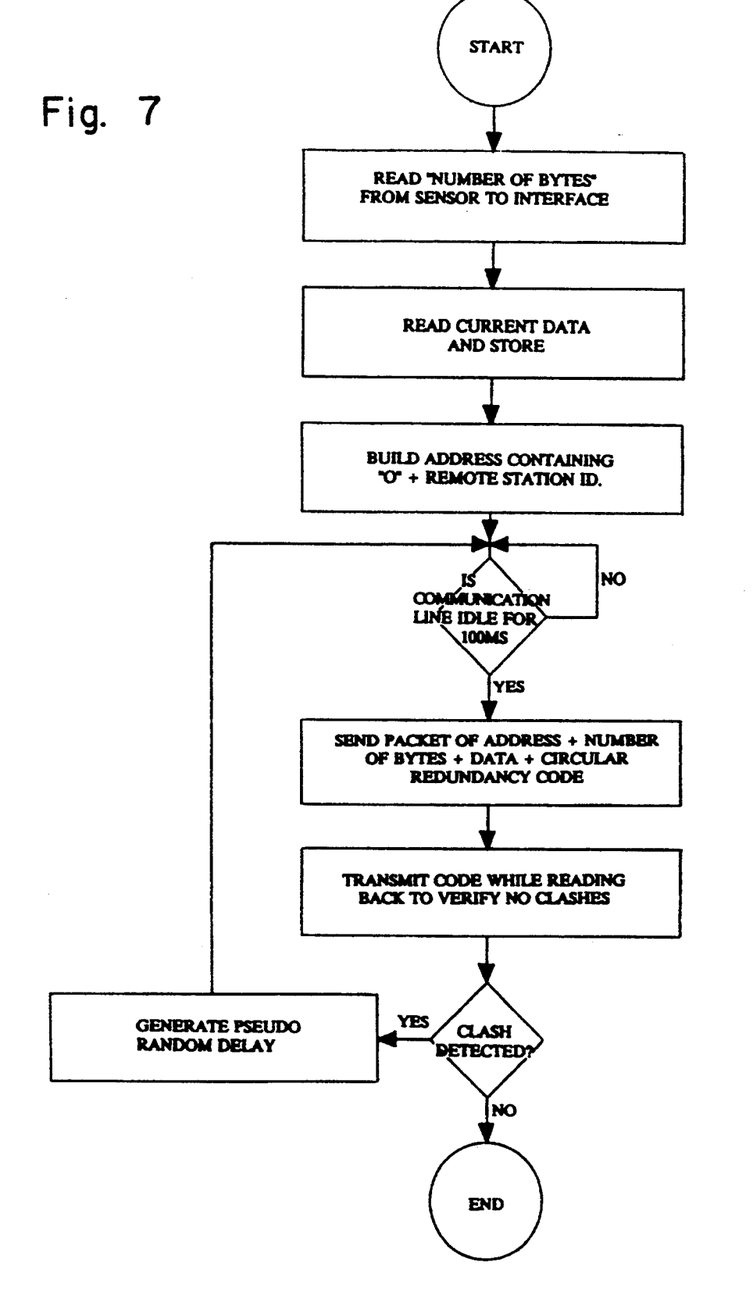
FIGS. 7 to 9 are flow charts illustrating the operation of the communication system.
Figure 8:
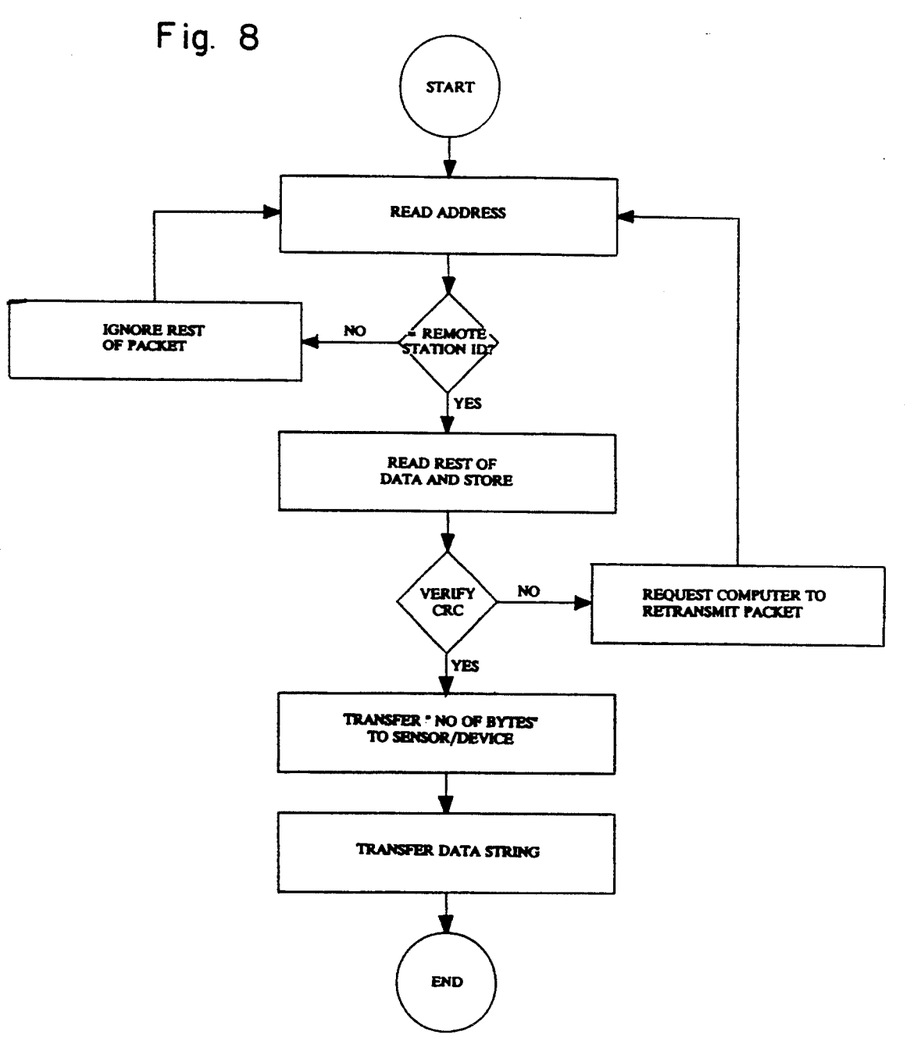
Figure 9:
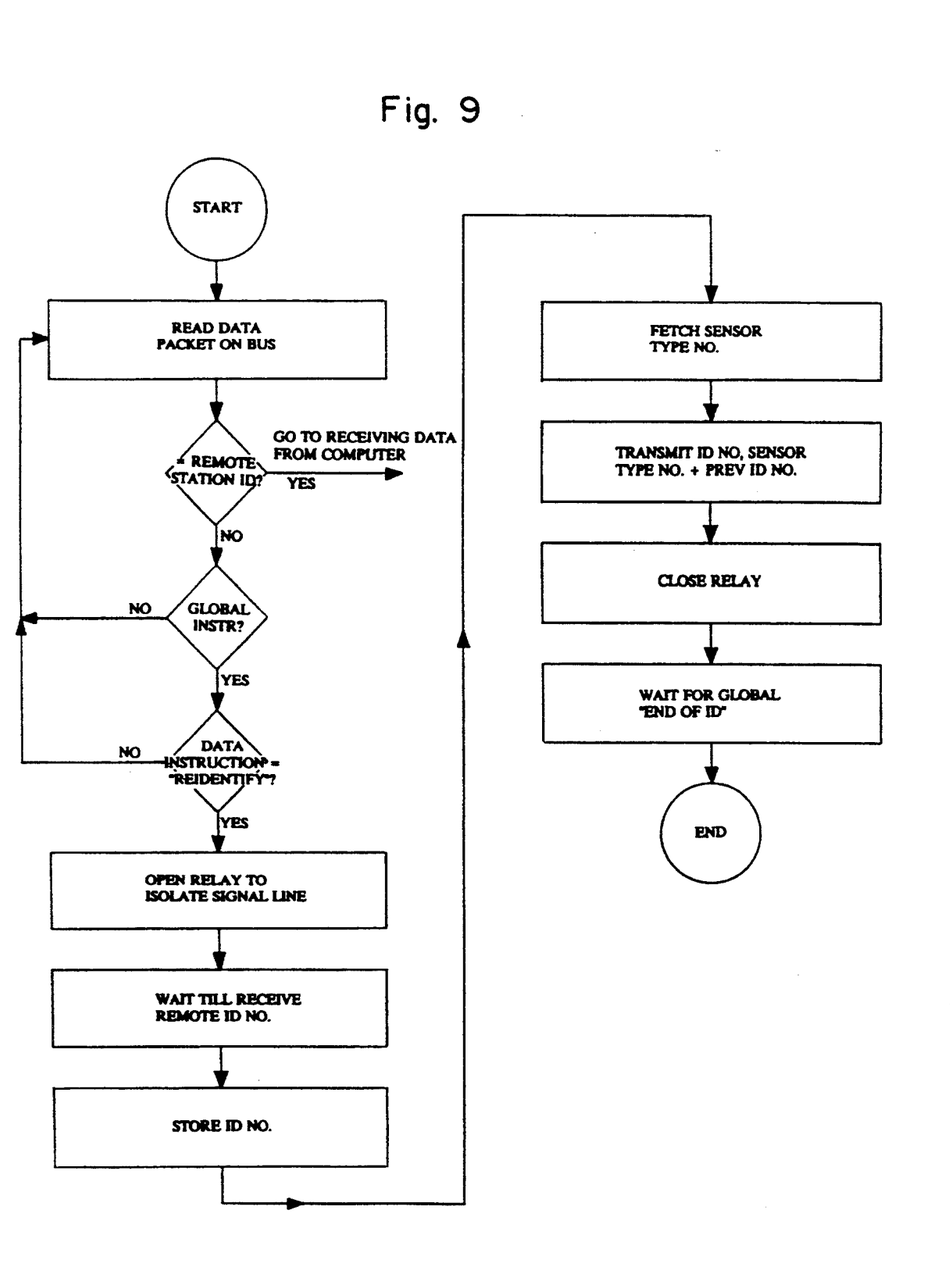

FIGS. 7, 8 and 9 are simplified flow charts illustrating graphically the operation of the communications interface of each remote station. The flow chart of FIG. 7 illustrates the operation of the interface in transmitting data to the central computer, while the flow chart of FIG. 8 illustrates the reception of data. The flow chart of FIG. 9 illustrates the identification or reidentification process which occurs when remote stations are allocated their address/identity by the central computer.

While the sensors at various remote stations can be "read" directly on instruction from the central computer, it is advantageous to utilise the processing power of the communications interface modules to reduce the amount of data transmission required between the control station and each remote station. For example, the central computer can instruct an interface to monitor its associated sensor and to report the sensor output values at regular intervals, say, once every five minutes. However, if the sensor output exceeds a predetermined threshold or otherwise alters in such a way as to indicate an alarm condition, the interface will report immediately.

Due to the provision of a pseudo random delay between transmissions from each remote station, and the fact that remote stations will retransmit their messages in the event of simultaneous transmissions, it is possible to allocate a high priority to certain sensors and to program them to interrupt the transmissions that are currently in progress until the transmitting stations sense the interruption and pause their transmissions. The high priority stations can then send their data before any other transmissions are resumed. No data is lost in this way, since the interrupted stations will repeat their transmissions until they are successfully received.

Figure 6:
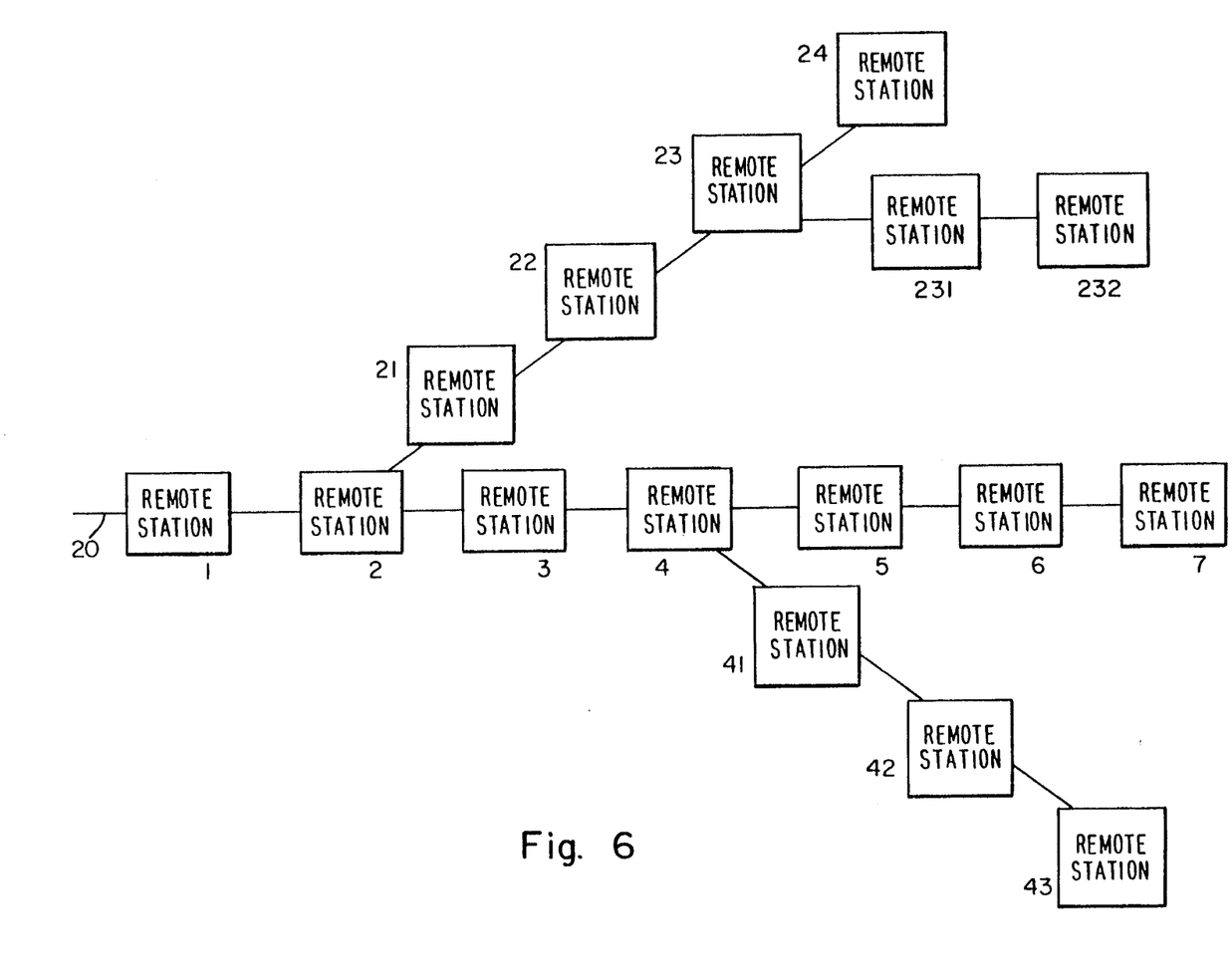
FIG. 6 is a schematic diagram showing the addressing system employed.

In the event of a spur being connected to the main harness, a special interface is fitted which communicates with the concentrator in a normal way, but which stores data for the spur line and retransmits it on the spur, using a secondary address for remote stations on that spur. FIG. 6 indicates, using a simplified address format, how remote stations on spurs and subspurs are addressed. The data concentrators are addressed in a similar way. Main harness 20 contains a plurality of remote stations 1-7, each containing a sensor and a monitoring device. A first spur line including remote stations 21-24 branches off of the main harness, as does the second spur line including remote stations 41-43. A sub spur line including remote stations 231, 232 branches off of the first spur line.

Figure 4:
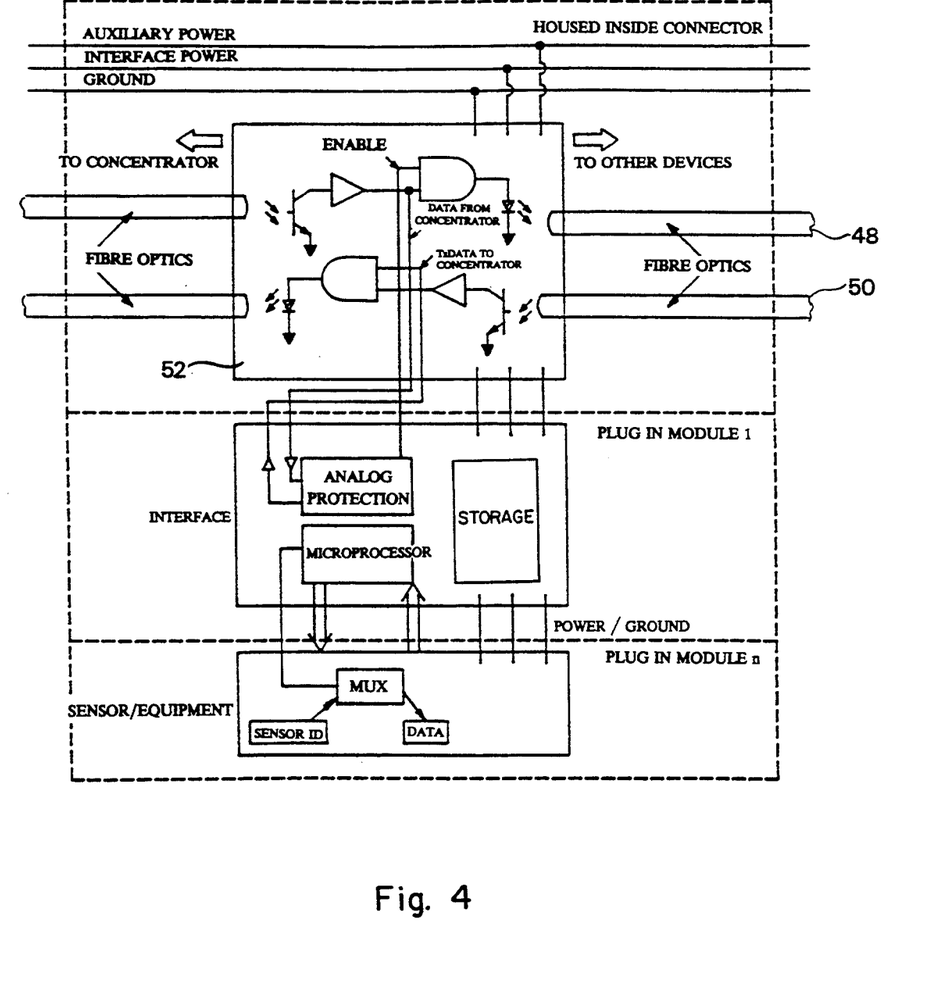
FIG. 4 is a schematic diagram of an alternative version of a remote station.
Figure 5:
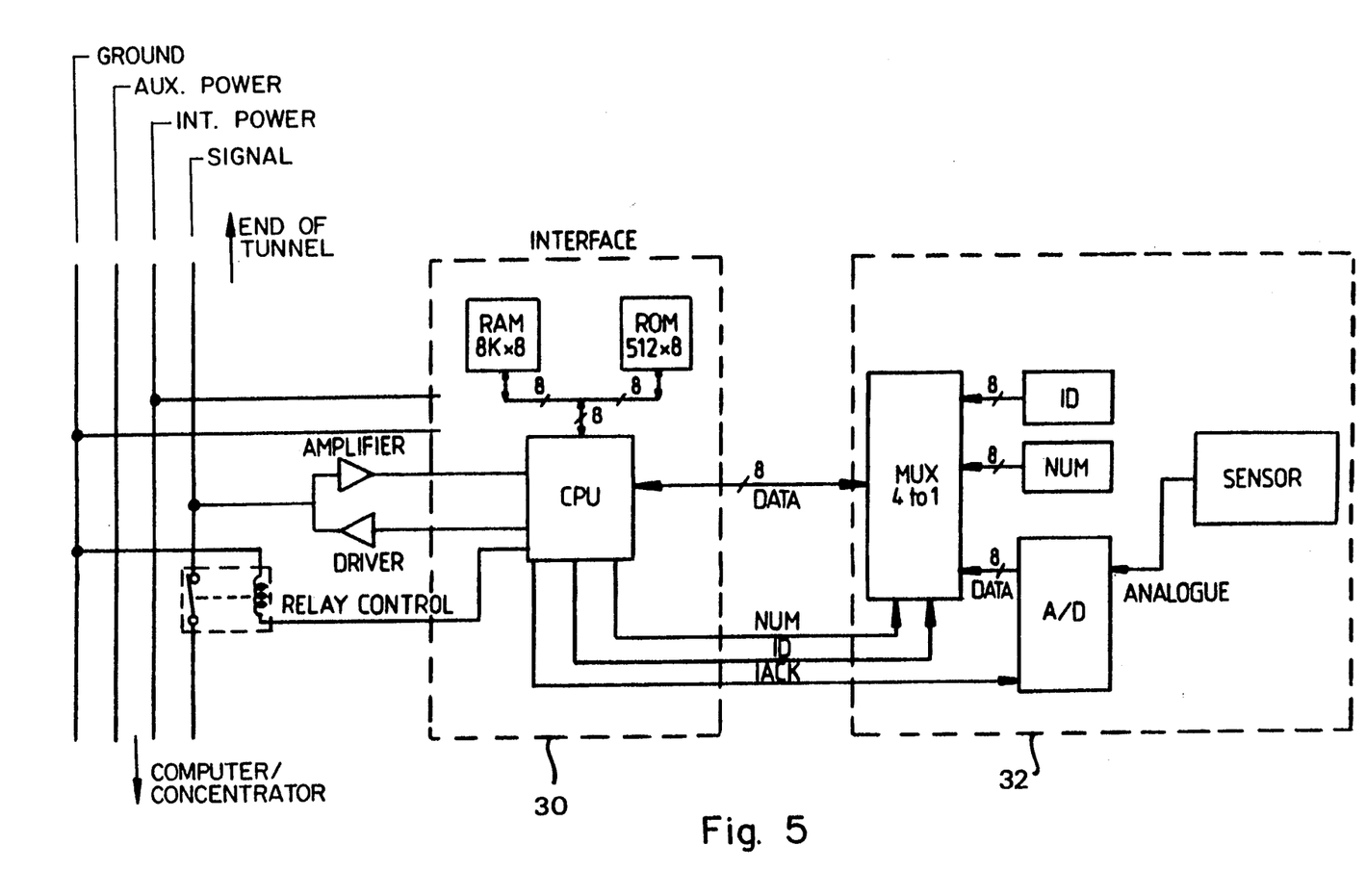
FIG. 5 is a schematic block diagram of the electrical circuitry of a remote station.

An alternative to the remote station of FIG. 2 is illustrated in FIG. 4, which employs a pair of optical fibres 48 and 50 in the place of the signal line 28. The auxiliary power, interface power and ground conductors are retained.

Apart from the use of optical fibres and an optical transmitter/receiver unit 52 the remote station of FIG. 4 functions exactly the same way as that of FIG. 2. However, a higher data rate is possible with the FIG. 4 version.

Figure 3:
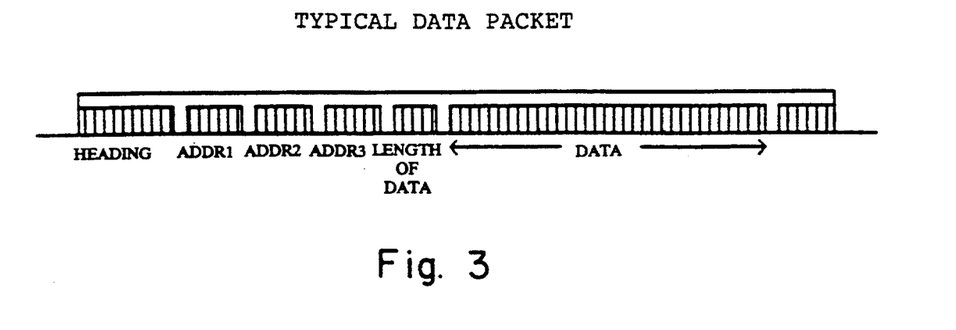
FIG. 3 illustrates a typical data packet used by the communication system.

A typical data packet used by the system is illustrated in FIG. 3. The packet comprises a heading for synchronizing the clocks of the various communications devices, primary, secondary and tertiary address bytes, a "length of data" byte, and a block of data bytes, followed by a circular redundancy code byte. The analogue circuitry of the interfaces 30 uses open collector circuitry with pull-up resistors, allowing clashes to occur with two interfaces transmitting simultaneously without damage being done.

The data concentrators 14 are microprocessor based and identify data transmitted on the main shaft bus 12 by reading address data from the data transmitted on the bus and extracting it for routing to the remote stations on the relevant level. The concentrators are similar to the interfaces 30, except that they have larger memories for buffering the large amount of information involved, and are able to convert from one data format to another.

The fact that each remote station can be identified, both with regard to its position and the type of sensor or monitoring device it contains, enables the computer of the central control station to generate a map of the entire system, and to monitor the changing of sensors or monitoring devices, and the reconfiguring or extension of the system. Thus, personnel underground can reconfigure the system according to their needs without having to communicate directly with personnel at the remote control station. When the next reset command is sent to the system, the computer at the remote control station can then update its map of the system automatically.

The described system is rugged and versatile, and is particularly useful in that it allows individual remote stations to be addressed uniquely and automatically. The communications interfaces are designed to draw little current (typically 20 mA) and the interfaces used are identical for all types of sensors and monitoring devices. This simplifies the configuring of the system and makes it more economical.

One of the central design principles of the described system is to reduce the amount of information relayed between the sensors and data concentrators to a minimum. This allows the bandwidth available to be utilised optimally, allowing many different sensors to co-exist efficiently in a single system. This is achieved largely by the use of the "intelligent" interface units of each remote station, which process data from the sensors or other equipment to which they are connected. In other words, the system makes use of a distributed data processing scheme, which does not require large volumes of raw data to be transmitted back and forth between various remote stations and a central computer or monitoring station.

The described system has application, for example, in large underground mines. In a pilot installation, provision is made for 4000 remote stations, which accommodate fifty different types of sensors or other peripherals. The central computer updates the layout of the complete system every five minutes, drawing a new map of the system layout, while simultaneously logging data and analysing readings from all the sensors, sending instructions to remote stations and/or associated equipment, and generating alarms where necessary. The system accommodates the needs of the mine personnel, allowing them to install sensors and peripherals as required, and to alter the configuration of the system from time to time, without this process having to be controlled centrally. The central computer simply notes the changes which are made and readdresses the system automatically.

We claim:

1. A communication system comprising a control station and a plurality of modular remote stations connected to the control station by a multi-conductor harness, the control station supplying the remote stations with electrical power and communicating bidirectionally with the remote stations via the harness and further being adapted to allocate address codes selectively to the remote stations and to store composite identification codes identifying both a location of each remote station and a function of sensors installed at each remote station; each remote station comprising:

a functional module, selected from a plurality of different types of functional modules, the functional module including a sensor and a memory element which stores a sensor code indicating the function of the sensor;

communication means comprising communication circuitry for receiving data from and sending data to the control station; and an interface module arranged to function with any of said plurality of different types of functional module and removably connected by plug-in connector means to said functional module, the interface module supplying electrical power to the functional module, transferring data from the functional module to the communication means, and including identification means for retrieving the sensor code from said memory element of the functional module and for generating a composite identification code derived from the sensor code and from an address code allocated to the remote station by the control station and transmitted to the remote station via the harness, and data storage means for storing the composite identification code, so that each remote station is effectively identified both by a remotely allocated address code and a sensor code indicating the function of the sensor of the functional module installed at that remote station.

2. A communication system according to claim 1 wherein the identification means includes processor means for generating the composite identification code from the allocated address code and the sensor code, for recording the composite code in the data storage means and for retrieving the composite code from the data storage means, the communication circuitry being adapted to send and receive the composite identification code and other data to and from the control station.

3. A communication system according to claim 1 wherein the harness includes a signal line controlled by switch means at each remote station, the communication circuitry of each remote station being adapted to operate the switch means to allow selective isolation of the remote stations from the control station, thereby to allow transmission of respective address codes from the control station to each remote station successively.

4. A communication system according to claim 3 wherein the communication circuitry of each remote station comprises means for monitoring the signal line during a transmission from said each remote station to detect data transmission by other remote stations, and for repeating a transmission from said each remote station if data transmission from another remote station is detected during said transmission from said each remote station.

5. A communication system according to claim 4 wherein the communication circuitry is adapted to repeat the transmission after a delay related to the address code or the sensor code.

6. A communication system according to claim 1 wherein a plurality of data concentrators are provided, each data concentrator being connected to a portion of the harness and communicating with remote stations on that portion of the harness and with the control station.

7. A communication system according to claim 1 wherein the harness includes at least one spur branching off a main harness route, the remote stations on said at least one spur being allocated a secondary address code identifying said at least one spur.

8. A communication system according to claim 1 wherein a plurality of software modules are stored by a central control station, each software module corresponding to a respective sensor code and being utilized to process data from functional modules at remote stations which correspond to the respective sensor code.

9. A communication system according to claim 1 wherein the central control station is adapted to generate a map indicating the location and function of each remote station from data transmitted to the central control station by the remote stations.

10. A communication system according to claim 9 wherein the central control station is adapted to record successive address codes associated with any sensor code, thereby to maintain a record of data transmitted from each functional module while installed at a particular remote station, even after removal of the functional module to another remote station.

11. A communication system according to claim 9 wherein the central control station is adapted to monitor changes in the address code of a remote station due to removal or insertion of functional modules at other remote stations between the remote station and the central control station, and to associate a new address code of the remote station with its previous address code, to ensure continuity of data transmitted between the remote station and the central control station.

12. A communication system according to claim 1 wherein the sensor code stored in the memory element of the functional module includes a first component indicating the function of the sensor of the functional module, and a second component uniquely identifying the particular functional module.

13. The communication system according to claim 12 wherein said first and second components comprise hard-wired bit codes.

14. A communication system comprising a control station and a plurality of modular remote stations connected to the control station by a multi-conductor harness, the control station supplying the remote stations with electrical power and communicating bidirectionally with the remote stations via the harness and further being adapted to allocate address codes selectively to the remote stations by generating and transmitting respective address codes thereto via the harness, and to store composite identification codes identifying both the location of each remote station and the function of sensors installed at each remote station; each remote station comprising:

a functional module, selected from a plurality of different types of functional modules, the functional module including a sensor and a memory element for storing a sensor code indicating the function of the sensor;

communication means comprising communication circuitry for receiving data from and sending data to the control station; and an interface module identical to the interface modules of other remote stations, arranged to function with any of said plurality of different types of functional module and removably connected by plug-in connector means to said functional module, the interface module including power supply means for supplying electrical power to the functional module, data transfer means for reading data from the functional module and for transferring the data read from the functional module to the communication means, identification means for generating a composite identification code derived from the sensor code and from the address code allocated to the remote station by the control station and transmitted to the remote station via the harness, and data storage means for storing the composite identification code, so that each remote station is effectively identified both by a remotely generated address code allocated thereto and a sensor code indicating the function of the sensor of the functional module installed at that remote station.

* * * * *